United States Patent [19]
Flotow

[11] Patent Number: 4,832,164
[45] Date of Patent: May 23, 1989

[54] ADJUSTER RING LOCK STRAP ADAPTED FOR USE IN MANUAL WEAR COMPENSATING CLUTCHES

[75] Inventor: Richard A. Flotow, Butler, Ind.

[73] Assignee: Dana Corporation, Toledo, Ohio

[21] Appl. No.: 62,307

[22] Filed: Jun. 15, 1987

[51] Int. Cl.⁴ .............................. F16D 13/75
[52] U.S. Cl. .................. 192/111 B; 192/70.25; 74/527
[58] Field of Search ............ 192/70.25, 111 A, 111 B; 74/527, 530

[56] References Cited

U.S. PATENT DOCUMENTS

| | | | |
|---|---|---|---|
| 1,361,511 | 12/1920 | Worbois | 192/111 B |
| 1,571,015 | 1/1926 | Leighton | 192/70.25 |
| 1,637,734 | 8/1927 | Carhart | 192/111 B |
| 2,758,691 | 8/1956 | Palm | 192/111 B |
| 2,874,816 | 2/1959 | Dehn | 192/111 B |
| 3,176,814 | 4/1965 | Sink | 192/111 B |
| 3,752,286 | 8/1973 | Sink | 192/111 A |
| 3,754,628 | 8/1973 | Hildebrand | 192/111 B |
| 4,034,836 | 7/1977 | Sink et al. | 192/99 A |
| 4,081,064 | 3/1978 | Smith et al. | 192/70.13 |
| 4,086,995 | 5/1978 | Spokas | 192/111 B |
| 4,193,485 | 3/1980 | Johns et al. | 192/85 CA |
| 4,285,424 | 8/1981 | Sink et al. | 192/111 B |
| 4,466,524 | 8/1984 | Lane | 192/70.25 |
| 4,549,643 | 10/1985 | Flotow et al. | 192/111 A |
| 4,720,002 | 1/1988 | Kitano et al. | 192/70.25 |

FOREIGN PATENT DOCUMENTS 890154 2/1962 United Kingdom .

OTHER PUBLICATIONS

Dana Engineering Drawing Part No. 195C62 Dated 08/14/73.
Dana Engineering Drawing Part No. 195C69 Dated 05/06/75.

Primary Examiner—Rodney H. Bonck
Assistant Examiner—Richard M. Lorence
Attorney, Agent, or Firm—MacMillan, Sobanski & Todd

[57] ABSTRACT

An adjuster ring for use in either a manually adjustable or automatically adjustable friction clutch is disclosed. The adjuster ring is generally annular in shape and is provided with a threaded outer circumferential surface. The outer circumferential surface cooperates with a corresponding threaded inner circumferential surface formed on a cover attached to a flywheel of the clutch. Gear teeth are formed about an inner peripheral surface of the adjuster, which are adapted to cooperate with an automatic wear compensating device. A plurality of spaced lugs are formed about the adjuster ring on one face. The lugs are adapted to cooperate with a manual lock strap. Either the automatic wear compensating device or the manual lock strap may be utilized with the adjuster ring, depending upon whether automatic or manual wear compensation is desired.

2 Claims, 4 Drawing Sheets

ADJUSTER RING LOCK STRAP ADAPTED FOR USE IN MANUAL WEAR COMPENSATING CLUTCHES

BACKGROUND OF THE INVENTION

The present invention relates in general to clutches which are either manually or automatically adjustable to compensate for wear of the components therein, and in particular to an adjuster ring adapted for use in either type of such clutches.

It is well known to utilize a spring-loaded friction clutch to selectively connect a vehicle engine to a drive train of the vehicle. Such clutches typically include a plurality of driving components, such as a flywheel and an annular pressure plate, which are connected to the vehicle engine for rotation about an axis. An intermediate plate may also be provided between the flywheel and the pressure plate. Although they rotate with the flywheel, the pressure plate and the intermediate plate are also axially movable relative to the flywheel. Such clutches further include a plurality of driven components, such as one or more annular driven discs, which are connected to the vehicle drive train by means of an output shaft. The driven discs are interposed between the flywheel and each of the pressure plates, while the output shaft is oriented co-axially with the axis of rotation of the driving components. The driven discs are also axially movable relative to the output shaft and to the flywheel. As is well known in the art, the pressure plate is selectively moved axially toward the flywheel (typically by means of a lever system) so as to frictionally engage the driven disc or discs therebetween when it is desired to connect the vehicle engine to the drive train of the vehicle.

Generally, only predetermined portions of the faces of the driving and driven components of the clutch are designed to frictionally engage one another. These portions are usually covered by a fibrous or similar facing material. Such facing material is subject to wear from repeated usage. As wear occurs, the facing materials become thinner, and the relative distances of axial movement of the various driving and driven components of the clutch increase, as is well recognized in the art. Such increases are generally considered to be detrimental, since the clutch is usually designed to perform optimally for a single predetermined distance of axial movement. Consequently, modern clutches frequently include an adjuster ring which compensates for wear of the facing material in order to maintain the original predetermined distance of axial movement.

Such an adjuster ring typically includes a threaded outer circumferential surface which cooperates with a corresponding threaded inner circumferential surface formed on a cover attached to the flywheel. The adjuster ring pivotally supports the radially outermost ends of a plurality of levers. The levers are disposed adjacent the driving pressure plate. The radially innermost ends of the levers are retained in an axially movable clutch collar disposed about the output shaft. Rotation of the adjuster ring relative to the clutch cover causes the adjuster ring (as well as the radially outermost ends of the levers) to move axially toward the flywheel, thereby decreasing the relative distance of axial movement of the components of the clutch between engaged and disengaged positions. Thus, as wear occurs in the clutch as described above, the adjuster ring can be rotated to compensate therefor.

In the past, the adjuster ring had to be manually rotated within the clutch in order to achieve the desired compensation for wear. Such a manual adjuster ring included a plurality of lugs formed about the periphery thereof, which were adapted to cooperate with a lock strap removably secured to the clutch cover. The lock strap was inserted between two adjacent lugs in order to prevent rotation of the adjuster ring relative to the cover during use. Consequently, the lock strap had to be removed to permit an adjustment to be made. More recently, the adjuster ring has been automatically rotated by means of an automatic wear compensating device. Such an automatic adjuster ring included an internal threaded surface which cooperated with the automatic wear compensating device to rotate the ring as wear occurred. Both of such adjuster rings are in common use today. While both types of adjuster rings are useful, they are not interchangeable in a manner which permits them to function properly. As a result, clutch rebuilders are required to stock both types of adjuster rings in their inventories. It would be desirable, therefore, to provide a single adjuster ring which can be utilized in a manually adjusted clutch (in combination with a lock strap) or in an automatically adjusted clutch (in combination with an automatic wear compensating device).

SUMMARY OF THE INVENTION

The present invention relates to such an improved adjuster ring for either type of friction clutch. The adjuster ring is generally annular in shape and is provided with a threaded outer circumferential surface. The outer circumferential surface cooperates with a corresponding threaded inner circumferential surface formed on a cover attached to a flywheel of the clutch. Gear teeth are formed about an inner peripheral surface of the adjuster, which are adapted to cooperate with an automatic wear compensating device. A plurality of spaced lugs are formed about the adjuster ring on one face. The lugs are adapted to cooperate with a manual lock strap. Either the automatic wear compensating device or the manual lock strap may be utilized with the adjuster ring, depending upon whether automatic or manual wear compensation is desired.

It is an object of the present invention to provide an improved adjuster ring which can be utilized in both manually and automatically adjustable clutches.

It is another object of the present invention to provide such a common adjuster ring which is simple and inexpensive in construction and operation.

Other objects and advantages of the present invention will become apparent to those skilled in the art from the following detailed description of the preferred embodiment, when read in light of the accompanying drawings.

1 through 3, a manual lock strap being shown in cooperation with the ring.

Figure 5:
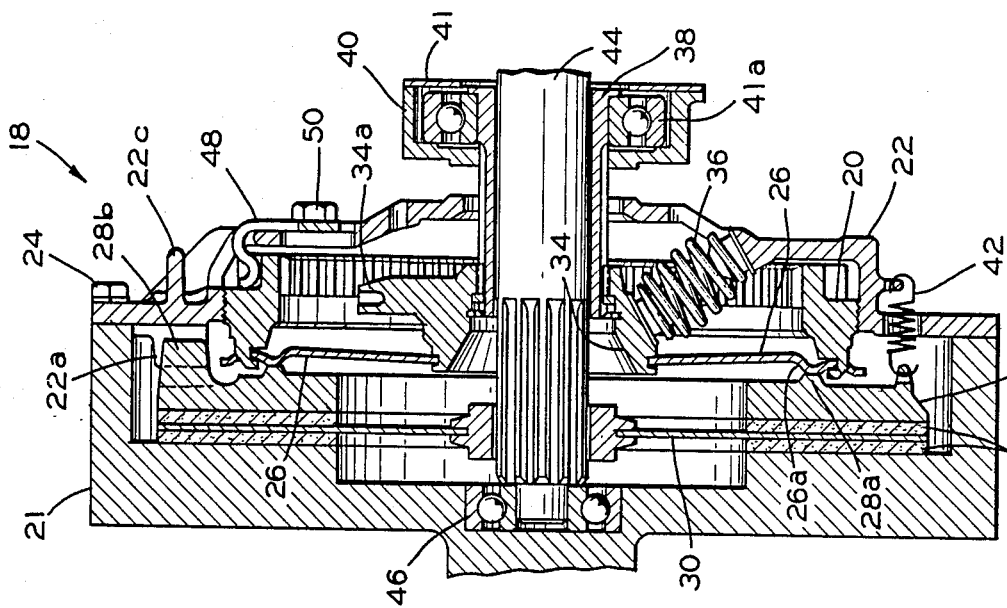
Figure 4:
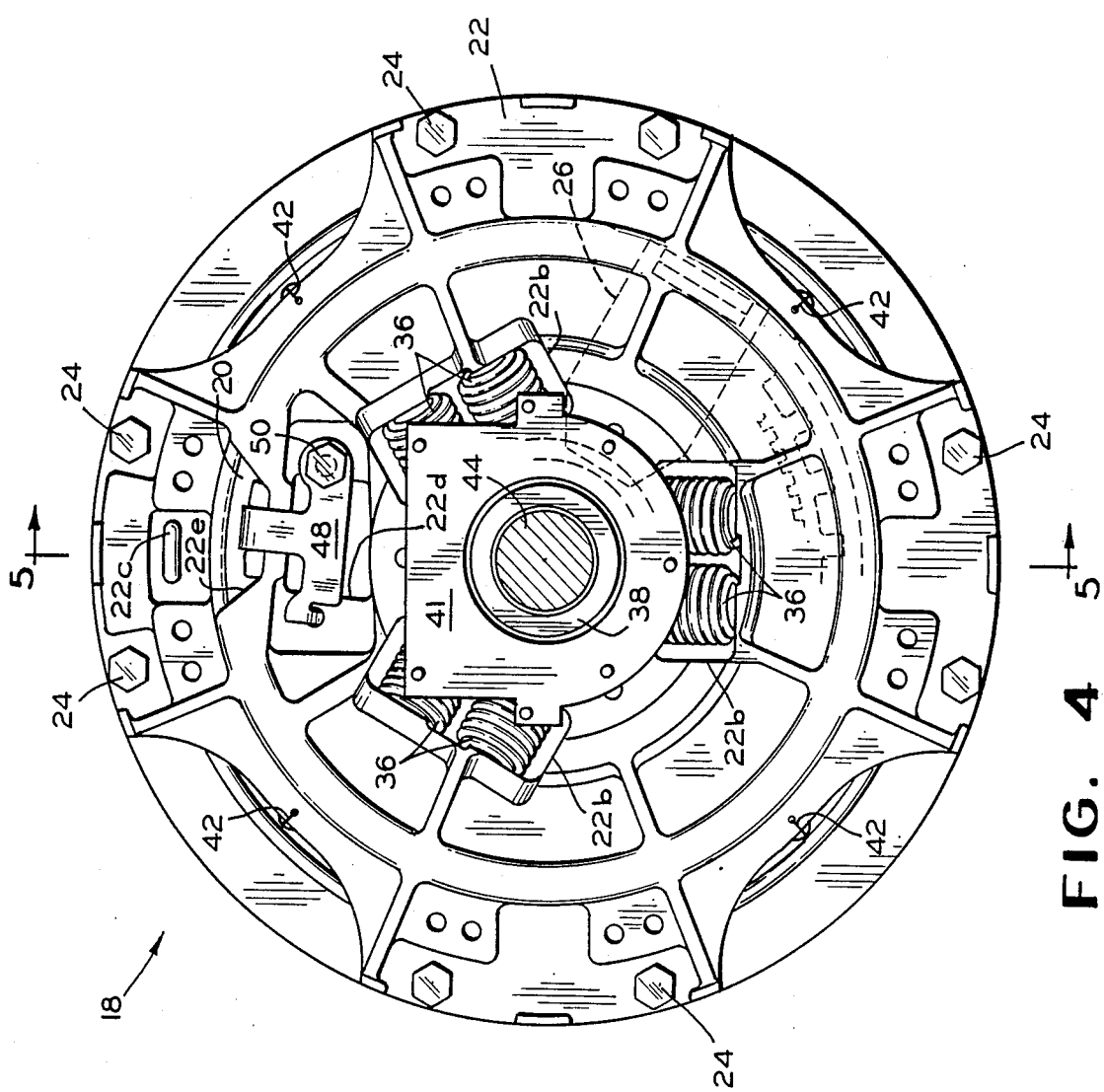
FIG. 4 is an end elevational view of a friction clutch assembly including the adjuster ring illustrated in FIGS.

FIG. 5 is a fragmentary sectional elevational view taken along line 5—5 of FIG. 4.

Figure 6:
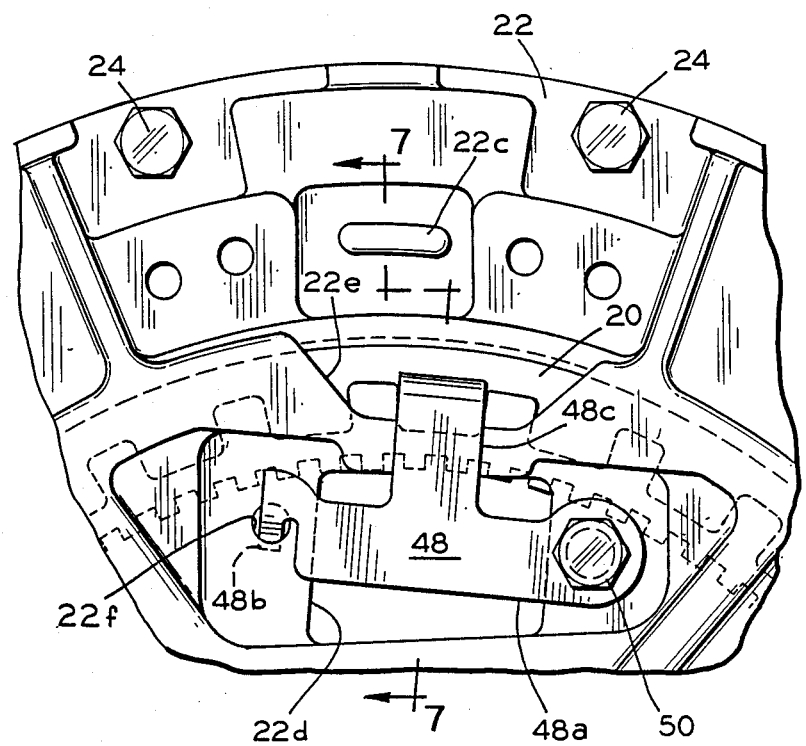

FIG. 6 an enlarged fragmentary elevational view of an upper portion of the friction clutch assembly illustrated FIG. 4.

Figure 7:
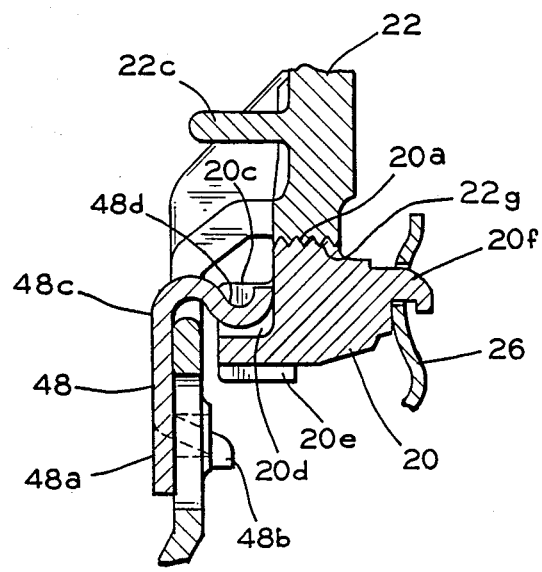

FIG. 7 is a sectional elevational view taken along line 7—7 of FIG. 6.

Figure 8:
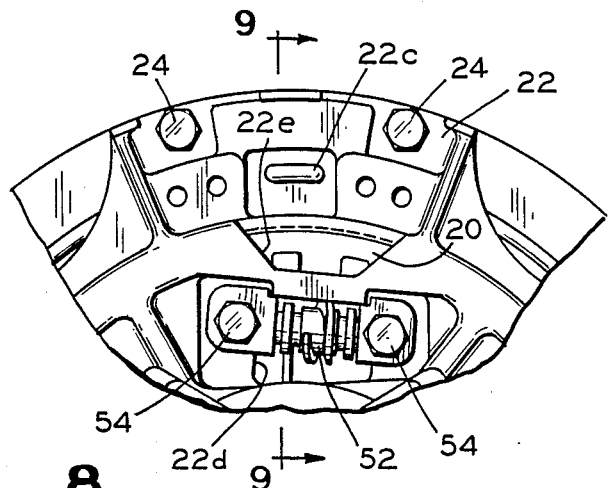

FIG. 8 is a view similar to FIG. 6 illustrating an automatic wear compensating mechanism in cooperation with the adjuster ring of the present invention.

Figure 9:
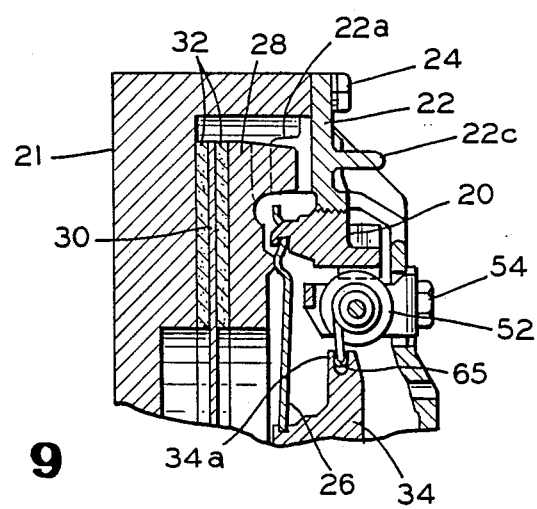

FIG. 9 is a sectional elevational view taken along line 9—9 of FIG. 8.

Figure 10:
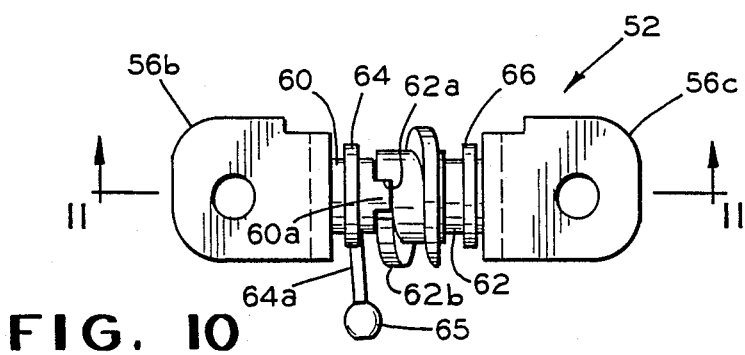

FIG. 10 is an elevational view of the automatic wear compensating mechanism illustrated in FIGS. 8 and 9.

Figure 11:
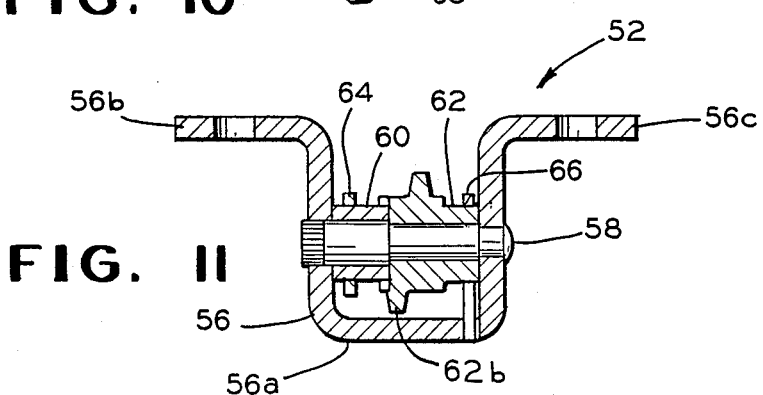

FIG. 11 is a sectional elevational view taken along line 11—11 of FIG. 10.

DETAILED DESCRIPTION OF THE PREFERRED EMBODIMENT

Figure 1:
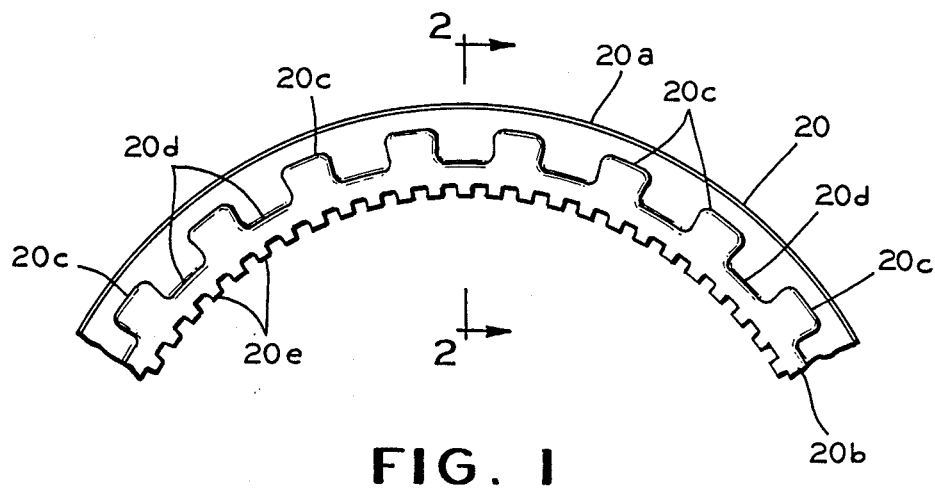
FIG. 1 is a fragmentary elevational view of one face of an adjuster ring in accordance with the present invention.
Figure 2:
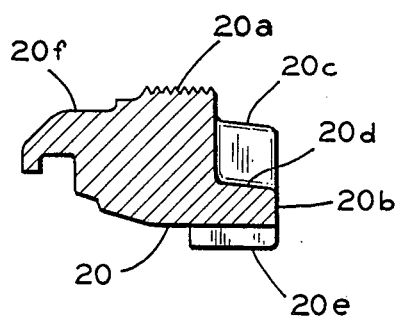
FIG. 2 is an enlarged sectional elevational view taken along line 2—2 of FIG. 1.
Figure 3:
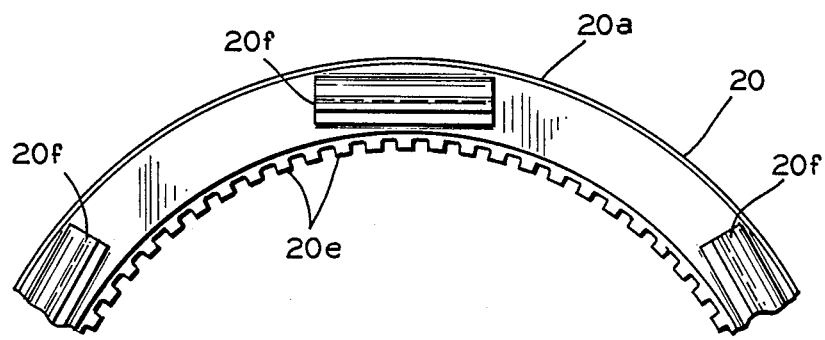
FIG. 3 is a fragmentary elevational view of the opposite face of the adjuster ring illustrated in FIG. 1.

Referring now to the drawings, there is illustrated in FIGS. 1 through 3 an improved adjuster ring 20 in accordance with the present invention. The adjuster ring 20 has a generally annular body including an outer circumferential threaded portion 20a. One face of the adjuster ring 20 is provided with an annular flange portion 20b. The flange portion 20b is formed integrally with the adjuster ring 20 and extends axially therefrom. A plurality of equally spaced lugs 20c are also formed integrally with the adjuster ring 20. The lugs 20c extend axially from the adjuster ring 20 in the same direction as the flange portion 20b, but also extend radially outwardly from the flange portion 20b. Each pair of adjacent lugs 20c defines a notch or recessed area 20d therebetween. The flange portion 20b is also provided with an inner circumferential surface, wherein a plurality of gear teeth 20e are formed. The teeth 20e extend radially inwardly from the flange portion 20b. As best shown in FIG. 3, the opposite face of the adjuster ring 20 is provided with a plurality of equally spaced lever mounting posts 20f. The lever mounting posts 20f are formed integrally with the adjuster ring 20 and are spaced equidistantly about the circumference thereof.

Referring now to FIGS. 4 and 5, a spring-loaded friction clutch assembly, indicated generally at 18, of the pull-to-release type is illustrated. The clutch 18 includes a flywheel 21 which is connected to an engine (not shown) or other source of power for rotation therewith. A flywheel cover 22 is secured to the flywheel 21 by a plurality of threaded fasteners 24. The cover 22 includes a threaded inner circumferential surface 22g (see FIG. 7) adapted to cooperate with the threaded outer circumferential surface 20a of the adjuster ring 20. As best illustrated in FIG. 4, the adjuster ring 20 can be secured to the cover 22 by threading it therein.

A plurality of radially extending clutch operating levers 26 are provided within the clutch 18. The radially outermost end of each of the levers 26 is received within and pivotally supported by a respective one of the mounting posts 20f formed integrally with the adjuster ring 20. An annular pressure plate 28 is disposed between the flywheel 21 and the cover 22, adjacent to the cover 22. The pressure plate 28 is connected to the cover 22 for rotation therewith by means of interleaved lug portions 28b and 22a formed respectively thereon. The pressure plate 22 has an annular shoulder 28a formed integrally on one face thereof. The shoulder 28a is disposed in an intermediate radial portion of the pressure plate 28 and extends axially toward the cover 22. The shoulder 28a is adapted to be engaged by fulcrum portions 26a of the levers 26, as is well known in the art. The flywheel 21, the cover 22, and the pressure plate 28 constitute the driving components of the clutch 18.

An annular driven disc 30 is disposed between the flywheel 21 and the pressure plate 28. The driven disc 30 has a plurality of friction pads 32 secured to the opposed faces thereof at its outer periphery. The driven disc 30 is splined onto an output shaft 44. The inner end of the output shaft 44 is supported in a bearing 46 recessed in the flywheel 21, while the outer end (not shown) of the output shaft 44 is connected in conventional fashion to the drive train of the vehicle. The driven disc 30 and the output shaft 44 constitute the driven components of the clutch 18. The output shaft 44 defines an axis about which all of the above described components of the clutch 18 rotate.

An annular actuating collar 34 for the clutch 18 is disposed about the output shaft 44. The collar 34 is operatively connected to the radially innermost ends of each of the levers 26. A radially outwardly extending lug portion 34a is provided on the actuating collar 34, for a purpose which will be described below. A plurality of angularly disposed compression springs 36 are mounted between the cover 22 and the collar 34 so as to normally bias the collar 34 toward a clutch-engaged position. A hollow cylindrical release sleeve 38 is also disposed about the output shaft 44. The release sleeve 38 is splined to an inner portion of the collar 34 for rotation therewith. However, the release sleeve 38 is secured against axial movement relative to the collar 34. A throw-out bearing 40 is secured to one end of the release sleeve 38. The throw-out bearing 40 includes a cover 41 and a roller bearing 41a disposed between the release sleeve 38 and the bearing cover 41. Near the radially outermost edge of the flywheel cover 22, a plurality of axially disposed return springs 42 are provided. Each of the return springs 42 has a first end hooked to the cover 22 and a second end hooked to the pressure plate 28. The return springs 42 urge the pressure plate 28 toward the cover 22, against the urging of the angularly disposed springs 36. The force exerted by the return springs 42 is less than the axial component of the force exerted by the angularly disposed springs 36.

In operation, the flywheel 21, the cover 22, and the pressure plate 28 are all rotated together by the vehicle engine. Because the angularly disposed springs 36 urge the actuating collar 34 axially toward the flywheel 21, the radially innermost ends of the levers 26 are also urged axially toward the flywheel 21. As a result, the fulcrum portions 26a of the levers 26 engage the annular shoulder 28a formed on the pressure plate 28 so as to move the pressure plate 28 axially toward the flywheel 21. As a result, the friction pads 32 of the driven disc 30 are frictionally clamped between the pressure plate 28 and the flywheel 21. Consequently, the driven disc 30 and the output shaft 44 also rotate with the flywheel 21, the cover 22, and the pressure plate 28. This is the engaged position of the clutch 18 and its associated components.

When it is desired to disconnect the driven components from the driving components, the throw-out bearing 40 is manually moved axially away from the flywheel 21 by a linkage (not shown) connected to a clutch pedal. As a result, the release sleeve 38, the actuating collar 34, and the inner ends of the levers 26 are also moved axially away from the flywheel 21. Such movement permits the return springs 42 to pull the pressure plate 28 away from the flywheel 21, thereby releasing the frictional engagement of the driven disc 30. Thus, the driven disc 30 and the output shaft 44 are no longer driven by the rotation of the flywheel 21. This is the disengaged position of the clutch 18 and its associated components.

After repeated engagement and disengagement of the clutch 18, the friction pads 32 wear and, consequently, become thinner than their original thickness. As a result, the distances of axial movement of the collar 34 and the pressure plate 28 between the engaged and disengaged positions increase. This phenomenon is discussed in U.S. Pat. Nos. 3,752,286 and 4,285,424, both owned by the assignee of the present invention. The disclosures of those two patents are incorporated herein by reference. In order to compensate for such wear, the adjuster ring 20 must be rotated relative to the cover 22 in order to move the radially outermost ends of the levers 26 (which are retained in the flange portions 20f of the adjuster ring 20) axially toward the flywheel 21 by an amount which will compensate for the amount of wear of the friction pads 32 and, therefore, maintain the distance of travel of the collar 34 and the pressure plate 28 between the engaged and disengaged positions relatively constant despite such wear. As mentioned above, such relative rotation of the adjuster ring 20 may be accomplished manually or automatically. However, the following discussion will show that the single adjuster ring 20 of the present invention can be utilized in either situation.

FIGS. 4 through 7 illustrate a first embodiment of a clutch 18, wherein the adjuster ring 20 is utilized in the manually adjusted mode. In this embodiment, an improved lock strap 48 is mounted on the cover 22 to secure the adjuster ring 20 in a desired position. A body portion 48a of the lock strap 48 extends across an opening 22d formed through the cover 22. A pair of apertures 22f (only one is illustrated) are also formed through the cover 22 and are disposed on opposite sides of the opening 22d. One side (the left side when viewing FIG. 6) of the body portion 48a of the lock strap 48 is formed having a bent tab 48b extending therefrom. The tab 48b is adapted to be inserted through one of the apertures 22f (the left aperture when viewing FIG. 6) and hooked thereunder, as illustrated in FIGS. 6 and 7. The other side (the right side when viewing FIG. 6) of the body portion 48a of the lock strap 48 is formed having an aperture (not shown). A bolt 50 is provided which extends through the aperture formed in the lock strap 48 into threaded engagement with the aperture 22f (the right aperture when viewing FIG. 6) formed through the cover 22.

The lock strap 48 is further provided with a tongue portion 48c, which extends perpendicularly from the body portion 48a. At its end, the tongue portion 48c is formed having an S-shaped end portion 48d. The S-shaped end portion 48d extends through a second opening 22e formed through the cover 22 into one of the recessed areas 20d defined on the adjuster ring 20 between adjacent lugs 20c. When the lock strap 48 in installed, relative rotation between the cover 22 and the adjuster ring 20 is prevented because of the S-shaped end portion 48d abuts the adjacent lugs 20c when such relative rotation is attempted.

When it is desired to rotate the adjuster ring 20 because of wear of the friction pads 32, the bolt 50 is initially removed. The lock strap 48 is then pivoted about the left aperture 22f in which the tab 48b extends such that the S-shaped portion 48d is then moved out of the recessed area 20d. A conventional tool (not shown) may then be inserted through the second opening 22e so as to extend into one of the recessed area 20d. The tool can be braced against one of a plurality of lugs 22c formed on the cover 22. The selected lug 22c acts as a fulcrum point, permitting the tool to effect rotation of the adjuster ring 20 relative to the cover 22. Following such rotation, the lock strap 48 can be reattached to the cover 22 to maintain the adjuster ring 20 in the desired position.

FIGS. 8 and 9 illustrate a second embodiment of the clutch 18, wherein the adjuster ring 20 is utilized in the automatically adjusted mode. In this embodiment, an automatic compensating device 52, illustrated in detail in FIGS. 10 and 11, is utilized to automatically effect rotation of the adjuster ring 20 as wear occurs to the friction pads 32. Two embodiments of the automatic wear compensating device 52 are described and illustrated in detail in the above-referenced U.S. Pat. Nos. 3,752,286 and 4,549,643. The automatic wear compensating device 52 can be secured to the cover 22 over the first opening 22d by a pair of threaded bolts 54. The automatic wear compensating device 52 includes a mounting bracket 56 having a generally U-shaped central portion 56a and a pair of mounting flanges 56b and 56c extending outwardly from the legs of the U-shaped central portion. A pin 58 is press fit in suitable apertures formed in the legs of the U-shaped central portion 56a. A pair of sleeves 60 and 62 are rotatably mounted on the pin 58. The sleeves 60 and 62 are operatively connected by a lost motion connection consisting of a pair of axially extending opposed drive lugs 60a (only one is illustrated) formed on the first sleeve 60 which are received in respective slots 62a formed in the second sleeve 62. The slots 62a are wider than the lugs 60a, thereby providing the lost motion connection. The portion of the second sleeve 62 adjacent to the first sleeve 60 has a larger diameter and is provided with a worm gear portion 62b.

A first single-coil square wire spring 64 is mounted on the first sleeve 60, while a second single-coil square wire spring 66 is mounted on the second sleeve 62. The springs 64 and 66 are constructed so as to be substantially equal in size and have internal diameters which are slightly smaller than the outer diameters of the corresponding sleeves 60 and 62. The springs 64 and 66 normally embrace the sleeves 60 and 62 under a light tension and thus exert a frictional drag on the sleeves. The first spring 64 provides a driving connection between the first sleeve 60 and the clutch actuating collar 34. To accomplish this, the first spring 64 includes a straight end portion 64a having a ball 65 secured thereto. The ball 65 is adapted to be disposed in a suitable recess formed in the lug portion 34a of the actuating collar 34 when the automatic wear compensating mechanism 52 is mounted on the cover 22. When so mounted, the worm gear portion 62b of the automatic wear compensating mechanism 52 is disposed in meshing engagement with the inner circumferential teeth 20e formed on the ring 20, as shown in FIG. 9. The manner of operation of the automatic wear compensating mechanism 52 is described in detail in the above referenced patents.

From the above description, it can be seen that the adjuster ring 20 of the present invention can be utilized in either the manually or automatically adjustable mode, depending only upon whether the lock strap 48 or the automatic wear compensator 52 is installed. This is possible because the adjuster ring 20 has both the lugs 20c (which cooperate with the S-shaped end portion of the lock strap 48) and the inner circumferential teeth 20e (which cooperate with the worm gear portion 62b of the automatic wear compensating mechanism 52) formed integrally therewith. The adjuster ring 20 of the present invention provides several significant advantages over individual manual and automatic adjuster rings of the prior art. First, the adjuster ring 20 of the present invention prevents misadjustment and possible damage to the clutch from occurring as a result of the inadvertent installation of the wrong type of adjusting mechanism (lock strap or automatic wear compensator) in a clutch having the other type of adjuster ring. For example, if a manual lock strap was inadvertently installed in a clutch having a prior art automatic wear compensating adjuster ring, the ring would not be prevented from rotating relative to the cover because the adjuster ring would have no lugs to cooperate with the lock strap. Similarly, if an automatic wear compensator was inadvertently installed in a clutch having a prior art manual adjuster ring, the ring would not be prevented from rotating relative to the cover because the adjuster ring would have no inner circumferential teeth to cooperate with the worm gear portion. A second advantage of the present invention is that the adjuster ring 20 of the present invention reduces the number of parts which must be manufactured for assembly and repair of clutches of the type described above. Similarly, the cost of stocking two different kinds of rings in inventory is eliminated. Accordingly, significant monetary savings are realized by the use of the present invention.

In accordance with the patent statutes, the principle and mode of operation of the present invention have been explained and illustrated in its preferred embodiment. However, it must be understood that the present invention may be practiced otherwise than as specifically explained and illustrated without departing from its spirit or scope.

What is claimed is:

1. A lock strap adapter to be mounted on a cover of spring loaded friction clutch to lock an adjuster ring in a predetermined position, said lock strap comprising:
   a body portion;
   means for securing said body portion to the cover, said securing means including tab means formed at one end of said body portion for insertion in a first aperture formed in the cover, and an aperture formed through an opposite end of said body portion, said aperture adapted to receive a threader fastener extending therethrough into a second aperture formed in the cover; and
   means extending from said body portion and terminating in an end portion adapted to engage the adjuster ring to lock it in a predetermined position.

2. A clutch assembly comprising:
   a cover including first and second apertures formed therethrough and an inner circumferential threaded portion;
   an adjuster ring having an outer circumferential threaded portion threaded in said inner circumferential threaded portion of said cover and a plurality of spaced apart lugs, adjacent pairs of said lugs defining recessed areas therebetween; and
   a lock strap including a body portion, means for securing said body portion to said cover, and means extending from said body portion into one of said recessed areas for locking said adjuster in a predetermined position relative to said cover, said means for securing said body portion to said cover including a bent tab formed at one end of said body portion inserted in said first aperture formed in said cover, an aperture formed through an opposite end of said body portion, and a threaded fastener extending through said body portion aperture into threaded engagement with said second aperture formed in said cover.

* * * * *

UNITED STATES PATENT AND TRADEMARK OFFICE
CERTIFICATE OF CORRECTION

PATENT NO. : 4,832,164

DATED : May 23, 1989

INVENTOR(S) : Richard A. Flotow

It is certified that error appears in the above-identified patent and that said Letters Patent is hereby corrected as shown below:

Col. 8, line 4, Claim 1, change "adapter" to -- adapted --.

Col. 8, line 4, Claim 1, after "of" insert -- a --.

Col. 8, line 13, Claim 1, change "threader" to -- threaded --.

Signed and Sealed this

Twelfth Day of December, 1989

Attest:

JEFFREY M. SAMUELS

*Attesting Officer*   *Acting Commissioner of Patents and Trademarks*